United States Patent
Gavit et al.

[11] 3,833,928
[45] Sept. 3, 1974

[54] VEHICLE-TRAILER ANGULAR POSITION SENSOR AND INDICATOR

[76] Inventors: Stephen E. Gavit, 4832 W. Gill Pl., Denver, Colo. 80219; William E. Stenson, 5332 Arbutus, Arvada, both of Colo. 80002

[22] Filed: Jan. 8, 1973

[21] Appl. No.: 321,858

[52] U.S. Cl.............. 340/52 R, 180/103, 340/282
[51] Int. Cl............................................. B60q 1/00
[58] Field of Search............ 340/52 R, 282; 180/103

[56] References Cited
UNITED STATES PATENTS
3,237,177   2/1966   Sparks et al. ..................... 340/52 R

*Primary Examiner*—Glen R. Swann, III

[57] ABSTRACT

A device for sensing and indicating the relative angular relationship between a tow vehicle and a trailer universally connected to the tow vehicle by a ball hitch assembly includes a sensor adapted to be mounted directly beneath the ball portion of the hitch assembly to function electro-mechanically in varying a potential output from the sensor dependent upon the relative angular relationship between the trailer and the tow vehicle whereby such angular relationship is displayed on an electrically responsive visual indicator mounted preferably on the control panel of the tow vehicle.

12 Claims, 9 Drawing Figures

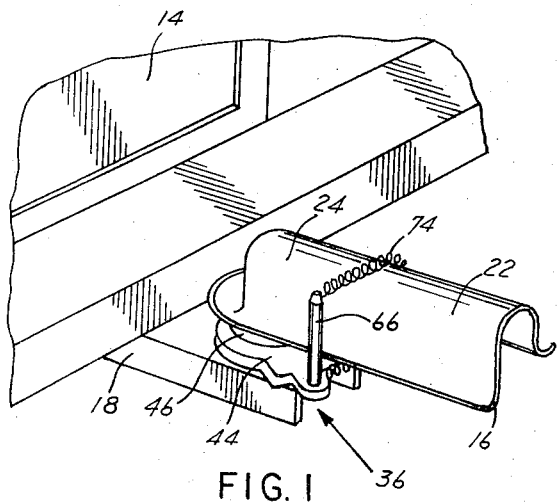
FIG. 1
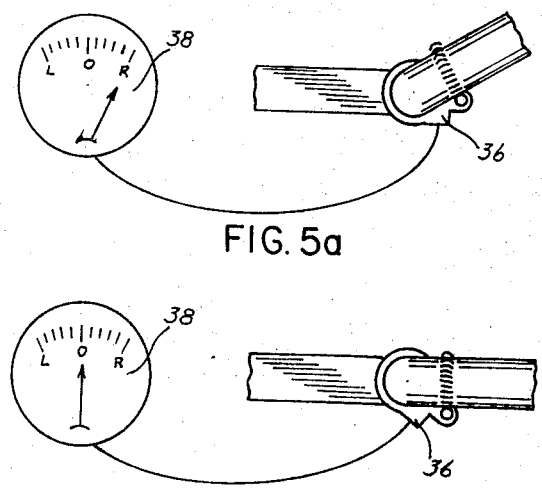
FIG. 5a
FIG. 5b
FIG. 5c
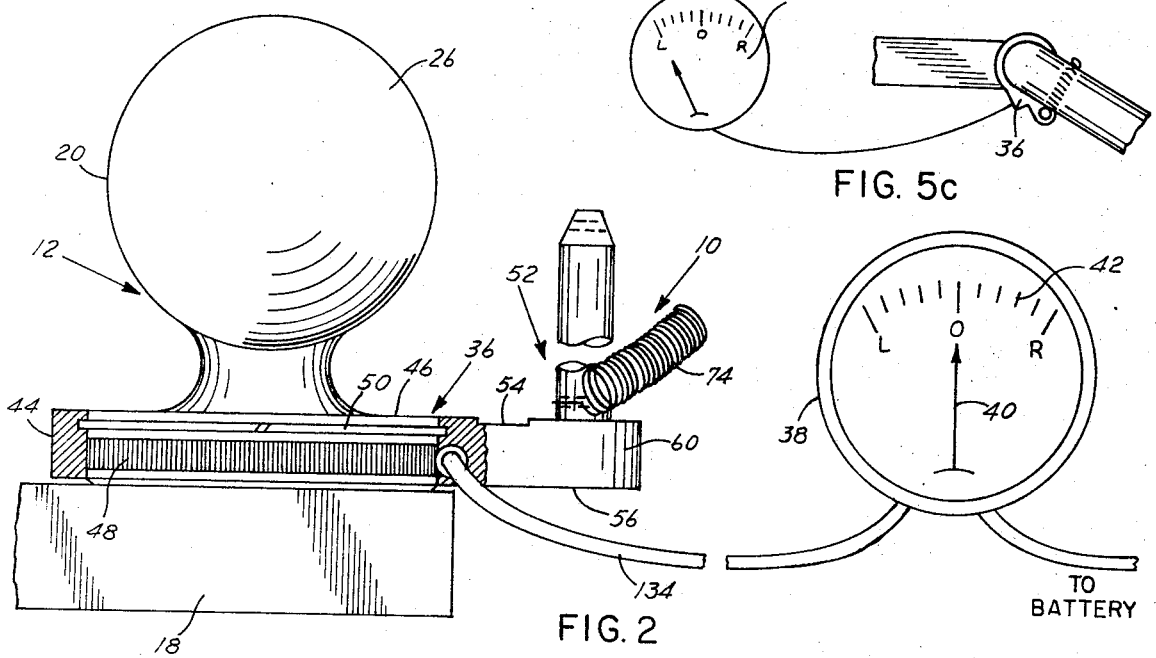
FIG. 2
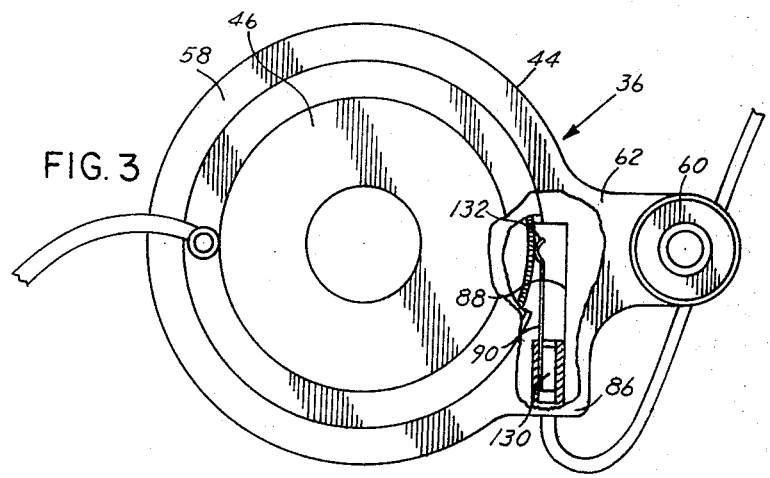
FIG. 3

PATENTED SEP 3 1974    3,833,928
SHEET 2 OF 2
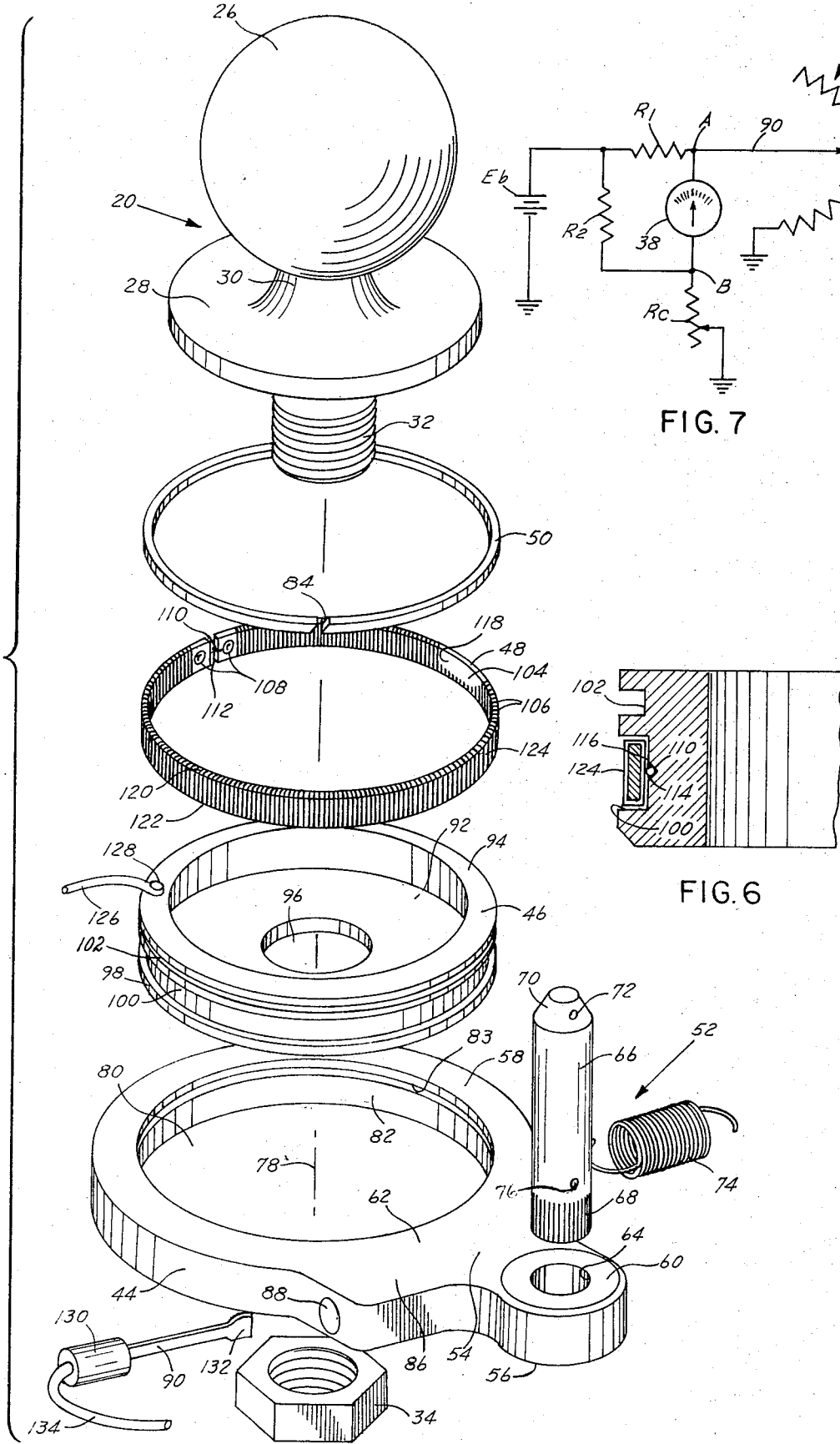

VEHICLE-TRAILER ANGULAR POSITION SENSOR AND INDICATOR

BRIEF SUMMARY OF THE INVENTION

The present invention relates generally to automotive accessories, and more particularly to a sensing and indicating device that informs the driver of a tow vehicle of the angular relationship between the tow vehicle and a trailer universally connected thereto.

It is well known that it is very difficult to drive a tow vehicle in reverse while maintaining desired alignment between the tow vehicle and a trailer universally connected thereto. This movement is further complicated when the tow vehicle is of the camper-type whereby the driver of the vehicle can only see behind the vehicle through side mirrors. As a solution to this problem, devices have been devised for indicating to the driver of the tow vehicle the relative angular positions of the tow vehicle and trailer.

The vehicle-trailer angular position sensor and indicator of the present invention has been designed so that a sensor portion thereof can be easily attached to and removed from conventional existing hitch assembly interconnecting a tow vehicle and trailer, and in a reliable manner electrically transmit to a visual indicator on the control panel of the tow vehicle information corresponding to the angular relationship between the tow vehicle and the trailer. The sensor portion is very simply constructed but is rugged and compact so as not to be easily damaged. Furthermore, the device is adapted to operate off a conventional battery-alternator electrical system used in automobiles, so that a separate and independent power source is not required.

More particularly, the device of the present invention includes a sensor having an inner ring member releasably connected to the shaft of the ball portion of a ball hitch assembly beneath the spherical head thereof to remain immovable relative to the ball portion which is mounted on the tow vehicle. An outer base member is rotatably disposed about the inner ring and includes releasable connection means for securing it to the tongue of the trailer, which carries the socket portion of the hitch assembly, whereby the base member will follow pivotal movement of the tongue about the longitudinal axis of the ball portion. For purposes of the present disclosure, the longitudinal axis of the ball portion is defined as being verticle when the tow vehicle is resting on a horizontal surface. An annular resistance element is disposed between the inner ring and the base member and is fixed relative to the inner ring to remain stationary therewith. The resistance element is engaged along its length by a wiper or contact element fixed in the base member to vary the effective resistance value of the resistance element dependent upon the angular relationship between the inner ring and the base member. Inasmuch as the base member moves with the tongue of the trailer, at least insofar as the tongue pivots about the longitudinal axis of the ball portion of the hitch assembly, and the inner ring remains stationary relative to the tow vehicle, the angular relationship between the inner ring and the base member will correspond to the angular relationship between the trailer and the tow vehicle as it exists in a plane normal to the longitudinal axis of the ball portion. With this arrangement and with the use of suitable electrical circuitry, this angular relationship can be displayed on a visual indicator on the control panel of the tow vehicle.

Accordingly, it is an object of the present invention to provide an automotive accessory adapted to be easily attached to or removed from a conventional hitch assembly connecting a tow vehicle to a trailer for indicating the relative angular relationship of the tow vehicle to the trailer.

It is another object of the present invention to provide an automotive accessory including a sensor adapted to be releasably mounted between the ball portion and socket portion of a conventional ball hitch assembly connecting a tow vehicle to a trailer and including an electrically responsive indicator electrically connected to the sensor for indicating the relative angular relationship between the trailer and tow vehicle.

It is another object of the present invention to provide a vehicle-trailer angular position sensor and indicator adapted to be mounted on a conventional ball hitch assembly connecting a tow vehicle to a trailer immediately beneath the spherical head of the ball portion thereof and including relatively rotatable members fixed relative to the tow vehicle and the trailer, respectively, such that an electrical signal responsive to the angular relationship between the members can be utilized to apprise the operator of the tow vehicle of the angular relationship between the tow vehicle and the trailer.

It is another object of the present invention to provide a vehicle-trailer angular position sensor and indicator having a sensor with an inner ring member anchored to the ball portion of a ball hitch assembly to remain stationary relative thereto, an outer base member connected to the tongue of the trailer to follow movement thereof in pivoting about the inner ring member, an annular resistance element between the inner ring member and the base member, a wiper disposed for selectively engaging the resistance element along its circumference, and a visual indicator device electrically mounted and connected to the sensor for visually indicating the relative angular relationship between the trailer and the tow vehicle as it exists in a plane normal to the longitudinal axis of the ball portion of the hitch assembly.

Other objects, advantages and features of the present invention will become more apparent as the description proceeds taken in conjunction with the accompanying drawings, in which:

BRIEF DESCRIPTION OF DRAWINGS

FIG. 1 is a fragmentary perspective view of a ball hitch connection between a tow vehicle and a trailer with the sensor portion of the device of the present invention mounted thereon;

FIG. 2 is a fragmentary side elevation of the device of the present invention with the sensor mounted on a ball hitch assembly and partially sectioned for clarity;

FIG. 3 is a top plan view of the sensor shown in FIG. 1 with a portion thereof broken away for clarity;

FIG. 4 is an enlarged exploded perspective view of the sensor shown in FIG. 1 including the ball portion of a ball hitch assembly;

FIGS. 5a, 5b and 5c are top plan operational views showing the operation of the angular position sensor and indicator in visually displaying the angular relationship between a trailer and a tow vehicle;

FIG. 6 is an enlarged fragmentary horizontal section taken through the inner ring member of the sensor with the resistance element mounted thereon; and FIG. 7 is a schematic diagram of the electrical control circuit for the angular position sensor and indicator of the present invention.

DETAILED DESCRIPTION

In order to facilitate an understanding of the vehicle-trailer angular position sensor and indicator 10 of the present invention, it will be described in connection with a conventional ball hitch assembly 12 interconnecting a tow vehicle 14 and a trailer 16, with a rearward extension plate 18 on the tow vehicle carrying the ball portion 20 of the ball hitch assembly and the tongue 22 of the trailer carrying the socket portion 24 of the ball hitch assembly. The ball portion 20 of the ball hitch assembly is shown in FIG. 4 having a substantially spherical head 26 connected to a relatively thin cylindrical base 28 by a reduced diameter neck 30; and a centrally located, threaded shaft 32 depends from the bottom surface of the base 28 for passage through an opening, not seen, in the rearward extension plate 18 of the tow vehicle for attachment thereto by a nut 34 threaded onto the shaft 32 from beneath the extension plate.

The angular position sensor and indicator 10 of the present invention is seen in FIG. 2 to include a sensor 36 and a visual indicator or meter 38 suitably interconnected in a manner to be explained later by electrical wiring. The visual indicator or meter 38 may take the form of a conventional electrically responsive microammeter such as of the type manufactured by Faria Meter Corporation of Uncasville, Connecticut under the model No. 1103. The microammeter is adapted to indicate with a pivotal needle or pointer 40 on a calibrated scale 42 the angular relationship between the tow vehicle 14 and the trailer 16 by a left or right deflection of the pointer from a zero or null reference point at the center of the scale, FIGS. 5a and 5c, the zero reference point indicating straight alignment of the trailer with the tow vehicle, FIG. 5b. The electrical cooperation between the visual indicator 38 and the sensor 36 will be described hereinafter.

The sensor 36, which functions as a rheostat in varying the potential across the visual indicator 38, is best seen in FIG. 4 to include an outer base member 44, an inner ring member 46 rotatably mounted in the base member, a resistance element 48 mounted on the inner ring member, a lock ring 50, and a connection assembly 52 mounted on the base member for connecting the base member to the tongue of the trailer.

The base member 44 of the sensor comprises a plate with flat top and bottom surfaces 54 and 56, respectively, and includes a circular main body portion 58, a circular head portion 60, and a neck portion 62 interconnecting the body portion to the head portion. The head portion 60 of the base member is adapted to support the connection assembly 52 and has a cylindrical recess 64 in its top surface 54 defining a seat for the lower end of a connecting bar 66. The lower end of the connecting bar has a plurality of closely spaced, radially extending circumferentially spaced grooves 68 and is press-fitted into the cylindrical recess 64 whereby the connecting bar is positively retained in the cylindrical recess and is rigid with respect to the base member. The top end 70 of the connecting bar is frusto-conical in shape and has a radial passage 72 therethrough adapted to releasably retain one end of a coil spring 74, the other end of which is received in a radial passage 76 near the lower end of the connecting bar. The coil spring 74 is adapted to be passed around the tongue 22 (FIG. 4) of the trailer to releasably hold the connecting bar 66 against one side of the tongue. The connection of the base member 44 to the tongue 22 allows the base member to follow pivotal movement of the tongue about the central vertical axis 78 of the ball portion 20 of the ball hitch assembly. However, the base member will not follow rolling movement of the trailer, i.e. pivotal movement about the tongue of the trailer. When the trailer rolls relative to the tow vehicle, the tongue will merely pivot within the looped coil spring 74 passing therearound and will not cause movement of the base member. The body portion 58 of the base member has a large cylindrical opening 80 therethrough. The cylindrical opening 80 defines an inner annular face 82 of the base member which is smooth along its lower edge and has an annular recess 83 of rectangular cross-section adjacent the top surface 54 of the base member for reception of the lock ring 50, which, as can be seen in FIG. 4, is split at 84 to facilitate radial expansion and contraction and which is square in transverse cross-section to fit into the annular recess 83 in the base member. The neck portion 62 of the base member has an enlarged offset segment 86 with a passage 88 therein which is substantially tangent to the cylindrical opening 80. The passage 88 is adapted to retain a conductive wiper or contact element 90 adapted to slidably engage the resistance element 48 as will be explained hereinafter.

The inner ring member 46 comprises a thin cylindrical disc of substantially the same diameter as the diameter of the cylindrical opening 80 in the base member. The inner ring member is adapted to be tightly but rotatably received in the cylindrical opening 80 in the body portion 58 of the base member 44 so as to be coaxial therewith and has a large centrally located cylindrical recess 92 in its top surface 94 adapted to seat the cylindrical base 28 of the ball portion 20 of the hitch assembly. A centrally located circular opening 96 is provided through the ring member 46 and is slightly larger in diameter than the diameter of the shaft 32 of the ball portion so that the inner ring can be slid onto the shaft so as to be coaxial with and extend radially and normally away therefrom. The outwardly directed annular face 98 of the ring member is provided with a relatively wide annular recess 100 of rectangular cross-section for seating the resistance element 48 and a relatively narrow upper annular recess 102 also of rectangular cross-section, corresponding to the annular recess 83 in the inner annular face 82 of the base member, and also adapted to seat the lock ring 50 to securely but rotatably mount the ring member in the base member.

The resistance element 48 comprises a core 104 of an insulating material taking the shape of a circular split ring having a rectangular cross-section; and a conductive wire 106 is tightly and closely wrapped around the core from one end to the other. As best seen in FIG. 6, the resistance element is adapted to be tightly seated in the relatively wide annular recess 100 in the outwardly directed face 98 of the ring member. The ends of the conductive wire 106 are soldered in eyelets 108 adjacent to the ends of the core with one end 110 of the conductive wire extending beyond its attachment to the associated eyelet and into alignment with the space 112 between the two ends of the core. A very thin shallow annular groove 114, FIG. 6, is etched or otherwise formed in the outwardly directed face 116 of the annular recess 100 and is adapted to receive the one end 110 of the conductive wire. With a suitable tool inserted through the space 112 between the ends of the resistance element, the sides of the annular groove 114 are crimped over the end 110 of the wire to mechanically and electrically connect the end of the wire to the inner ring member. This connection helps to prevent relative rotation between the resistance element and the inner ring member and also assures that the one end 110 and the inner ring member remain at the same electrical potential. The inner annular face 118 of the resistance element along the top and bottom edges 120 and 122 respectively are coated with an insulating varnish or other like material, not seen, to insulate the resistance element from the inner ring member, but the portion of the conductive wire 106 on the outer annular face 124 of the resistance element is left exposed for engagement by the wiper 90 disposed in the passage 88 of the neck portion of the base member.

When assembling the sensor 36, the resistance element 48 is placed in the relatively wide, annular recess 100 in the ring member 46. The lock ring 50, which has an inner diameter slightly less than and an outer diameter slightly greater than the diameter of the cylindrical opening 80 in the base member, is placed in the inwardly opening annular recess 83 in the base member and forcefully expanded to be entirely received within the recess 83. The ring member 46 is then slid into the cylindrical opening 80 in the base member until the lock ring contracts into the relatively narrow annular recess 102 in the ring member so as to lie partially within the narrow annular recess 102 in the ring member and in the annular recess 83 in the base member. The lock ring thereby serves to retain the ring member 46 within the cylindrical opening 80 in the base member 44 while preventing relative axial movement and allowing pivotal movement between the two members. It should be noted that since the transverse cross-sectional configuration of the lock ring 50 corresponds to the cross-sectional configuration of the annular recesses 83 and 102 in which it is retained, it positively prevents relative axial movement between the base and ring members. It will be appreciated, in FIG. 2, that the outwardly directed face of the resistance element 48 is disposed in facing relation to the smooth lower portion of the inner annular face 82 of the cylindrical opening 80 in the base member but is spaced therefrom, FIG. 6, since the thickness of the resistance element is less than the depth of the annular groove 100 in the inner ring member. As will be explained later, the inner ring member is maintained at some fixed potential, such as ground potential, by a wire 126 attached to the top surface of the inner ring at 128 (FIG. 4), and with the one end 110 of the conductive wire 106 on the resistance element connected to the inner ring member, it is also maintained at the fixed potential.

As is best seen in FIG. 3, the wiper or contact element 90 has an insulating cylindrical collar 130 around its base end and a contact head 132 at its opposite end adapted to rest in engagement with the outer face of the resistance element 48. The outer diameter of the insulating collar 130 is slightly greater than the diameter of the passage 88 in the neck portion of the base member so that the collar can be press-fitted into the passage 88 to positively position the wiper within the passage and out of engagement with the base member 44. As shown in FIG. 2, the base end of the wiper is connected to an electrical wire 134 which passes to the visual indicator 38 and subsequently to an electrical power source, such as the battery of the tow vehicle, and is operative to cause the pointer 40 on the indicator to move in response to relative rotational movement between the ring member 46 and the base member 44 of the sensor.

When the sensor 36 is mounted on the ball portion 20 of the hitch assembly the base 28 of the ball portion fits into the cylindrical recess 92 in the top of the inner ring member 46 so that the shaft 32 on the ball portion extends through the opening 96 in the ring member and passes through the rearward extension plate 18 of the tow vehicle so that it can be securely attached to the rearward extension plate by the nut 34 threaded onto the shaft beneath the rearward extension plate. When the nut 34 is tightened onto the shaft, the inner ring member is drawn tightly against the top surface of the rearward extension plate whereby friction between the rearward extension and the inner ring will prevent relative rotation therebetween. Accordingly, the inner ring member remains stationary relative to the rearward extension and thus the tow vehicle. As is best seen in FIG. 2, the inner ring 46 extends a slight distance beyond the bottom flat surface 56 of the base member 44 so that the base member does not touch the rearward extension plate 18 and is, therefore, free to pivot about the ring member and thus the longitudinal axis 78 of the ball portion of the hitch assembly. Since the connection assembly 52 on the base member is secured to the tongue 22 of the trailer, pivotal movement of the trailer about the longitudinal axis 78 of the ball portion of the hitch assembly will cause the base member of the sensor to pivot a corresponding amount about the ring member. This pivotal movement causes the wiper 90 to be moved along the outer face of the resistance element 48 thereby varying the resistive value of the resistance element as will be better appreciated with the description of the control circuit for the device hereinafter.

In a preferred embodiment of the sensor 36, the base member 44 is made of aluminum and the ring member 46 of bronze with the resistance element 48 having its core of linen base phenolic resin and wrapped with conductive nichrome wire. The connecting bar 66 is preferably case hardened to provide a sturdy and long lasting connection assembly between the base member and the tongue of the trailer.

Referring now to FIG. 7, a schematic electrical control circuit diagram is shown for the vehicle-trailer angular position sensor and indicator of the present invention. It is to be understood that the indicator meter 38 of the device is pre-adjusted so that the pointer 40 on the indicator meter will be pointed at the centered zero or null point of the scale on the meter when the trailer 16 is in straight alignment with the tow vehicle 14 so that angular displacement of the trailer relative to the tow vehicle in a plane normal to the longitudinal axis of the ball portion will be indicated by the pointer. With the circuit connected as shown in FIG. 7, and with the wiper 90 positioned near the center of the resistance element 48 as shown, there exists a potential from point A to ground equal to $E_1$. $R_c$ represents a calibration rheostat which may or may not be incorporated into the meter and which can be adjusted so that the pointer 40 is centered at the null point or zero position on the scale 42 when the tow vehicle and the trailer are in straight alignment. When the tow vehicle turns, a change in the angular relationship between the trailer and the tow vehicle results and the change is reflected by a variance in the resistance value of the resistance element due to the wiper being advanced along the resistance element. This change in the resistance value of the resistance element effects a corresponding change in the potential at point A; however, the potential at point B will remain essentially the same so that the visual indicator will indicate the incremental change in potential as a displacement either to the right or left of midscale, depending upon the polarity of the connections. The source potential $E_b$ may be the tow vehicles battery-alternator system and current-limiting resistors $R_1$ and $R_2$ are included and selected according to circuit parameters to allow utilization of low-power components which eliminate unnecessary energy being taken from the source potential.

Accordingly, it will be appreciated that the vehicle-trailer angular position sensor and indicator of the present invention utilizes a very simple and inexpensive sensor adapted to be easily connected to or removed from a conventional hitch connection between a tow vehicle and trailer and includes a conventional visual display indicator or meter for use in displaying to the operator of the tow vehicle the relative angular relationship between the tow vehicle and the trailer.

Although the present invention has been described with a certain degree of particularity, it is understood that the present disclosure has been made by way of example and that changes in details of structure may be made without departing from the spirit thereof.

What is claimed is:

1. A device for sensing and indicating the relative angular relationship between a tow vehicle and trailer connected thereto by a hitch assembly, the tow vehicle having the male portion of the hitch assembly fixedly mounted thereon and the trailer having the female portion of the hitch assembly, comprising in combination:

sensor means mounted on said hitch assembly, an outer member of said sensor means having a circular opening therein and being attached to either one of said trailer and tow vehicle for movement therewith, an inner member of said sensor means mounted in said circular opening of the outer member for pivotal movement within said outer member and attached to the other of said trailer and tow vehicle for movement therewith such that pivotal movement of the trailer relative to the vehicle will effect pivotal movement of the outer member relative to the inner member, an electrical resistance element of said sensor mounted between said outer member and said inner member and fixed to one of said members so as to follow movement of one of said members relative to the other of said members, a contact element of said sensor fixed relative to said other member and disposed in contact with said resistance element to advance along the resistance element upon relative movement between the outer member and the inner member, and an electrically responsive indicator means electrically connected to said sensor means and to an electrical power source, operative to indicate the relative angular relationship between said trailer and tow vehicle.

2. The device of claim 1 wherein said inner member is fixed to said male portion and is concentric with a longitudinal axis of the male portion, and wherein said outer member and said inner member are disposed in a plane normal to said longitudinal axis, and further including a rigid connection rod on said outer member extending adjacent to said female portion of the hitch assembly and connection means for releasably connecting the connection rod to the female portion whereby said outer member follows movement of the trailer.

3. The device of claim 2, wherein said inner member has an outwardly directed peripheral groove for reception of said resistance element, and means for connecting the resistance element to the inner member for unitary movement therewith.

4. The device of claim 3, wherein said outer member has a passage therein communicating with said circular opening and wherein the contact element is disposed within said passage, and further including insulating means for retaining said contact element in the passage and in engagement with said resistance element.

5. The device of claim 4 wherein said passage communicates with said circular opening along a path which is tangent to the inner surface of the circular opening.

6. The device of claim 4 wherein said inner member and one end of said resistance element are electrically grounded, said contact element is connected to one terminal of the said indicator means, and another terminal of the indicator means is connected to the electrical power source whereby the relative positions of the inner and outer members, which correspond to the relative positions of the tow vehicle and trailer, are indicated on the indicator means.

7. A device for sensing and visually indicating the relative angular relationship between a tow vehicle and a trailer connected to the tow vehicle by a hitch assembly for universal movement relative thereto, the hitch assembly including a ball portion with a spherical head, a base beneath the head, and a reduced diameter depending shaft adapted to be passed through a rear portion of the tow vehicle and tightened thereagainst by tightening means, and a socket portion adapted to receive the spherical head and which is carried by the forward end of a tongue on the trailer, comprising in combination:

a first member immovably mounted concentrically on the shaft of the said ball portion between said base and the rear portion of the tow vehicle, a second member mounted on said first member for pivotal movement relative thereto, connection means mounted on said second member and releasably connected to the tongue of the trailer to follow movement of the tongue, rheostat means comprising a resistance element and a movable contact element one of said resistance and contact elements being operatively connected to each of said first and second members, the resistance value of said rheostat means being dependent upon the relative angular relationship between said first and second members, and electrically responsive visual indicator means electrically connected to said rheostat means and to an electrical power source to visually indicate the relative angular relationship between said tow vehicle and trailer.

8. A device for sensing and visually indicating the relative angular relationship between a tow vehicle and a trailer pivotally connected to the tow vehicle by a hitch assembly, the hitch assembly including a ball portion with a spherical head, a base beneath the head, and a reduced diameter depending shaft passing through a rear portion of the tow vehicle for attachment thereto by drawing the base tightly against the rear portion, and a socket portion adapted to receive the spherical head and which is carried by the forward end of a tongue on a trailer, comprising in combination:

sensor means mounted on said hitch assembly, an inner member of the sensor means having a substantially cylindrical configuration, a central axial passage through the inner member of a corresponding diameter to the shaft of the ball portion of the hitch assembly, said inner member being mounted on the shaft immediately beneath the base of the ball portion in concentric relation to a longitudinal axis of the ball portion and tightened against the rear portion so as to be immovable relative to the ball portion, an outer member of the sensor means having a circular opening therein to pivotally receive the inner member, lock means on said sensor pivotally interconnecting the inner member and the outer member to prevent relative axial movement with the inner member extending downwardly below the outer member thereby spacing the outer member from the rear portion of the tow vehicle so that the outer member is movable relative to the tow vehicle, connection means on said sensor interconnecting the outer member to the tongue of the trailer so that the outer member pivots about the inner member and said longitudinal axis in correspondence to pivotal movement of the trailer relative to the tow vehicle about said longitudinal axis, an elongated resistance element of said sensor mounted between said inner member and said outer member and fixed to said inner member for unitary movement therewith, a contact element of said sensor mounted on said outer member for movable engagement with said resistance element along the length of the resistance element, and electrically responsive visual indicator means electrically connected to said contact element and to an electrical power source for visually indicating the relative angular relationship between said tow vehicle and trailer.

9. The device of claim 8 wherein said inner member has an outwardly directed peripheral groove in which the resistance element is seated, and further including means for insulating said resistance element from the inner member except at one end of the resistance element, and means at said one end for mechanically and electrically connecting the resistance element to the inner member.

10. The device of claim 9, further including a passage in said outer member communicating with said circular opening for reception of the contact element, and insulating means for retaining said contact element in the passage and in engagement with said resistance element.

11. The device of claim 10, wherein said inner member is electrically grounded, said contact element is connected to the electrical power source and to one terminal of the visual indicator means, and another terminal of the visual indicator means is connected to the electrical power source whereby the relative positions of the inner and outer members, which correspond to the relative positions of the tow vehicle and trailer, are visually indicated on the indicator device.

12. The device of claim 10, wherein said inner member has a second outwardly directed peripheral groove and said outer member has an inwardly directed peripheral groove, and wherein said lock means comprises a split ring seated in said second peripheral groove of the inner member and said peripheral groove of the outer member to prevent relative axial movement between the inner and outer members.

* * * * *